United States Patent
Shan

(10) Patent No.: US 11,294,112 B2
(45) Date of Patent: Apr. 5, 2022

(54) POLARIZING PLATE, MANUFACTURE METHOD OF THE SAME, AND CURVED DISPLAY PANEL

(71) Applicant: HKC CORPORATION LIMITED, Guangdong (CN)

(72) Inventor: Jianfeng Shan, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 604 days.

(21) Appl. No.: 16/307,646

(22) PCT Filed: Dec. 8, 2017

(86) PCT No.: PCT/CN2017/115262
§ 371 (c)(1),
(2) Date: Dec. 6, 2018

(87) PCT Pub. No.: WO2019/071780
PCT Pub. Date: Apr. 18, 2019

(65) Prior Publication Data
US 2021/0223449 A1  Jul. 22, 2021

(30) Foreign Application Priority Data
Oct. 10, 2017  (CN) .......................... 201710937044.0

(51) Int. Cl.
*G02B 5/30* (2006.01)
*G02B 1/14* (2015.01)
(Continued)

(52) U.S. Cl.
CPC ...... *G02B 5/3033* (2013.01); *B29D 11/00644* (2013.01); *G02B 1/14* (2015.01);
(Continued)

(58) Field of Classification Search
CPC ........ G02B 1/14; G02B 5/3033; G02B 5/223; G02B 5/3025; G02B 5/30; G02B 1/08;
(Continued)

(56) References Cited

U.S. PATENT DOCUMENTS 7,154,573 B2  12/2006 Ide
7,349,156 B2   3/2008 Daiku
(Continued)

FOREIGN PATENT DOCUMENTS

CN  102540537 A  7/2012
CN  104793281 A  7/2015
(Continued)

OTHER PUBLICATIONS

International Search Report for Application No. PCT/CN2017/115262 dated Jul. 5, 2018, 11 pages.

*Primary Examiner* — Michael H Caley
*Assistant Examiner* — Jonathan Y Jung
(74) *Attorney, Agent, or Firm* — Hauptman Ham, LLP

(57) ABSTRACT

A manufacture method of a polarizing plate includes: providing a polarizing layer, where the polarizing layer includes multiple curved areas having different curvatures; and performing stretching processing on at least some curved areas, to adjust a polarizing alignment axis direction of a stretched curved area and a corresponding viewing angle.

16 Claims, 3 Drawing Sheets

(51) Int. Cl.
*G02F 1/1335* (2006.01)
*B29D 11/00* (2006.01)
*G02F 1/1333* (2006.01)
*G02B 1/08* (2006.01)

(52) U.S. Cl.
CPC .......... *G02F 1/133528* (2013.01); *G02B 1/08* (2013.01); *G02B 5/30* (2013.01); *G02B 5/3025* (2013.01); *G02F 1/133305* (2013.01); *G02F 2201/56* (2013.01)

(58) Field of Classification Search
CPC ........... G02F 1/133528; G02F 2201/56; G02F 1/133305; G02F 1/133531; H01L 2251/5338; H01L 51/0097; G09F 9/301; B32B 2038/0028; B32B 2307/42; B29D 11/00644
See application file for complete search history.

(56) References Cited

U.S. PATENT DOCUMENTS

| | | | |
|---|---|---|---|
| 2005/0264882 A1 | 1/2005 | Daiku | |
| 2005/0094058 A1 | 5/2005 | Ide | |
| 2007/0141243 A1* | 6/2007 | Bell | B29D 11/0073 427/163.1 |
| 2009/0096965 A1* | 4/2009 | Nagata | G02F 1/133305 349/103 |
| 2013/0169907 A1 | 7/2013 | Wang et al. | |
| 2016/0154276 A1* | 6/2016 | Saitoh | G02F 1/133502 349/61 |
| 2016/0191837 A1* | 6/2016 | Huh | G06F 1/1626 348/564 |
| 2016/0306087 A1 | 10/2016 | Jeon et al. | |
| 2017/0001461 A1* | 1/2017 | Okawa | B42D 25/29 |
| 2017/0183504 A1* | 6/2017 | Ueki | G02F 1/133528 |
| 2017/0226317 A1* | 8/2017 | Fukagawa | C08K 5/12 |
| 2018/0088263 A1* | 3/2018 | Wilson | B29C 69/00 |
| 2019/0079231 A1* | 3/2019 | Sumimura | C08G 63/64 |

FOREIGN PATENT DOCUMENTS

| | | |
|---|---|---|
| CN | 105353544 A | 2/2016 |
| CN | 106468797 A | 3/2017 |

* cited by examiner

POLARIZING PLATE, MANUFACTURE METHOD OF THE SAME, AND CURVED DISPLAY PANEL

CROSS REFERENCE TO RELATED APPLICATIONS

This is a National Stage application of, and claims priority to, PCT/CN2017/115262, filed Dec. 8, 2017, which claims priority to Chinese Patent Application No. 201710937044.0, filed Oct. 10, 2017, the disclosures of which are incorporated herein by reference in their entirety.

TECHNICAL FIELD

This application relates to the field of display technologies, and more particularly relates to a polarizing plate, a manufacture method thereof, and a curved display panel.

BACKGROUND

With the requirement of times, a conventional flat display panel has been gradually tended to a curved display panel. Compared with the flat display panel, the curved display panel has features such as a large viewing angle and a beautiful shape, and is increasingly popular. However, a polarizing plate design of the flat display panel is still used in a conventional curved display panel, and there is a problem of a relatively narrow viewing angle in actual use.

SUMMARY

Accordingly, it is necessary to provide a polarizing plate, a manufacture method thereof, and a curved display panel, to meet a wide viewing angle requirement of a curved display panel.

A manufacture method of a polarizing plate includes: providing a polarizing layer, where the polarizing layer includes multiple curved areas having different curvatures, and a curvature of each curved area is greater than or equal to 2000 R; and performing stretching processing on at least some of the curved areas, to adjust a polarizing alignment axis direction of a stretched curved area and a corresponding viewing angle, where the stretching processing makes an included angle of the polarizing alignment axis range from 0 to 180 degrees relative to that before the stretching.

A polarizing plate includes: a polarizing layer, including a main visual area and at least one auxiliary visual area, where the auxiliary visual area is connected to at least one side of the main visual area, a curvature of the auxiliary visual area is not equal to a curvature of the main visual area, the curvatures of the auxiliary visual area and the main visual area are both greater than or equal to 2000 R, the auxiliary visual area has a polarizing alignment axis direction different from that of the main visual area, to adjust a viewing angle of the auxiliary visual area, and an included angle between a polarizing alignment axis of the auxiliary visual area and a polarizing alignment axis of the main visual area ranges from 0 to 180 degrees; a protective layer, disposed on at least one side of the polarizing layer, and used to separate the polarizing layer from an external environment; and an adhesive layer, disposed on one side of the protective layer relative to the polarizing layer, and used to adhere the polarizing plate on a curved display panel.

A curved display panel includes: a first polarizing plate; and a second polarizing plate, where the first polarizing plate and the second polarizing plate are the foregoing polarizing plate, where the curved display panel includes a main visual area and at least one auxiliary visual area, the auxiliary visual area of the curved display panel is connected to at least one side of the main visual area of the curved display panel, a curvature of the auxiliary visual area of the curved display panel is greater than a curvature of the main visual area of the curved display panel, and an angle formed at a joint of a light-out surface of the main visual area of the curved display panel and a light-out surface of the auxiliary visual area of the curved display panel is greater than 90 degrees and less than 180 degrees. In the foregoing polarizing plate and curved display panel, the auxiliary visual area has a polarizing alignment axis direction different from that of the main visual area, to adjust a viewing angle of the auxiliary visual area, so that the polarizing layer has a different axial polarization according to a position/curvature thereof in the curved display panel, and the polarizing plate entirely has a multiaxial polarization, thereby meeting a wide viewing angle requirement of the curved display panel.

In the foregoing manufacture method of a polarizing plate, stretching processing is performed on some of the curved areas of the polarizing layer, to adjust a polarizing alignment axis direction of a stretched curved area and a corresponding viewing angle, so that the polarizing layer has a different axial polarization according to a position/curvature thereof in the curved display panel, and the polarizing plate entirely has a multiaxial polarization, thereby meeting a wide viewing angle requirement of the curved display panel.

BRIEF DESCRIPTION OF THE DRAWINGS

To illustrate the technical solutions according to the embodiments of the present disclosure or in the prior art more clearly, the following briefly introduces the accompanying drawings for describing the embodiments or the prior art. Apparently, the accompanying drawings in the following description show only some embodiments of the present disclosure, and a person of ordinary skill in the art may still derive drawings of other embodiments from these accompanying drawings without creative efforts.

DETAILED DESCRIPTION OF THE EMBODIMENTS

For ease of understanding, the present disclosure will be described more comprehensively with reference to the accompanying drawings. The accompanying drawings give preferred embodiments of the present disclosure. However, the various embodiments of the present disclosure may be embodied in many different forms and should not be construed as limited to the embodiments set forth herein. Rather, these embodiments are provided so that this disclosure will be thorough and complete, and will fully convey the scope of the invention to those skilled in the art.

A conventional curved display panel uses a curved polarizing plate having a uniaxial polarization. Thus, a curved viewing angle is narrower than a flat viewing angle. Therefore, it is necessary to provide a manufacture method of a polarizing plate that meets a wide viewing angle requirement of the curved display panel. The polarizing plate mainly processes a polarizing layer, so that the polarizing layer has a multiaxial polarization.

Figure 1:
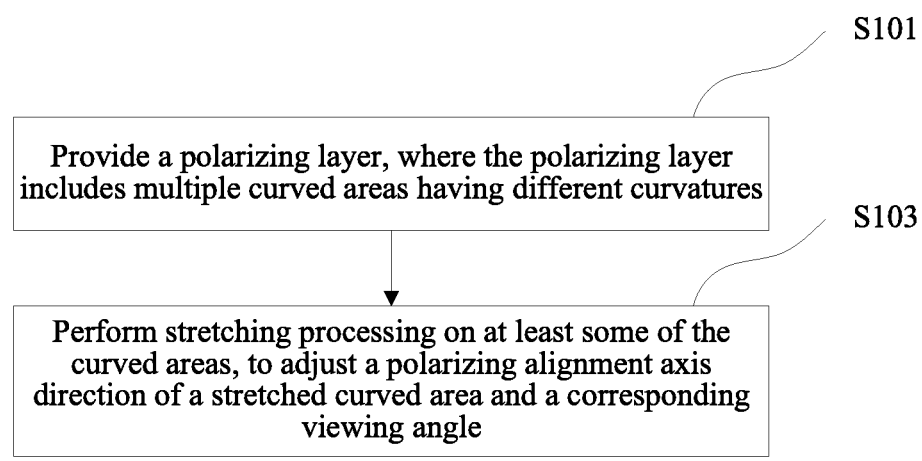
FIG. 1 is a flowchart of a manufacture method of a polarizing plate in accordance with an embodiment.

FIG. 1 is a flowchart of a manufacture method of a polarizing plate in an embodiment, which includes following steps.

In step S101, a polarizing layer is provided.

An effect of the polarizing layer of a polarizing plate allows only light having a particular vibration direction in light to penetrate, and absorbs light in other vibration directions, thereby converting light having no polarization into polarized light. A liquid crystal display (LCD) uses the polarizing plate to convert light emitted from a backlight module into polarized light, and uses a torsion property of liquid crystal molecules, to adjust light that penetrates. The polarizing plate in this embodiment is applicable to the curved display panel, and therefore, the polarizing layer includes multiple curved areas having different curvatures. In an embodiment, the polarizing layer includes a main visual area and at least one auxiliary visual area, the auxiliary visual area is connected to at least one side of the main visual area, and a curvature of the auxiliary visual area is not equal to a curvature of the main visual area.

Figure 3:
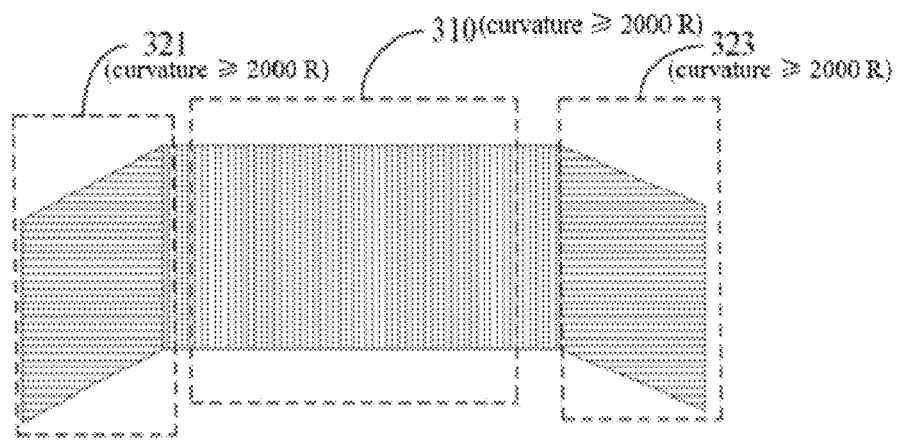
FIG. 3 is a schematic diagram of a polarizing layer in accordance with an embodiment.

In an embodiment shown in FIG. 3, the polarizing layer includes a main visual area 310, an auxiliary visual area 321 connected to one side of the main visual area 310, and an auxiliary visual area 323 connected to another side of the main visual area 310.

In step S103, stretching processing is performed on at least some of the curved areas, to adjust a polarizing alignment axis direction of a stretched curved area and a corresponding viewing angle.

The stretching processing may perform stretching on different curved areas of the polarizing layer by using different stretching forces or perform stretching on different curved areas of the polarizing layer by using different stretching directions, so that the different curved areas of the polarizing layer have different polarizing alignment axis directions. The polarizing alignment axis is a light transmittance axis of the polarizing layer.

In the foregoing manufacture method of a polarizing plate, stretching processing is performed on some of the curved areas of the polarizing layer, to adjust a polarizing alignment axis direction of a stretched curved area and a corresponding viewing angle, so that the polarizing layer has a different axial polarization according to a position/curvature thereof in the curved display panel, and the polarizing plate entirely has a multiaxial polarization, thereby meeting a wide viewing angle requirement of the curved display panel.

Figure 2:
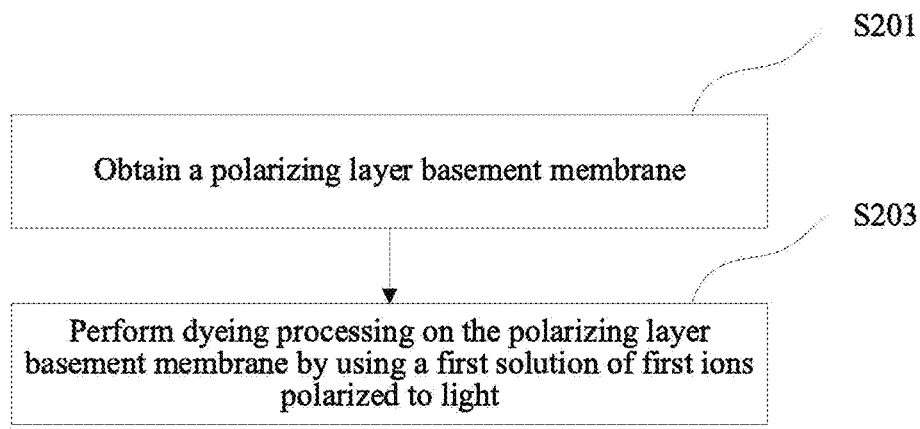
FIG. 2 is a flowchart of substeps of step S101.

In an embodiment, as shown in FIG. 2, step S101 specifically includes following steps.

In step S201, a polarizing layer basement membrane is obtained.

In this embodiment, a material of the polarizing layer basement membrane can be a poly vinyl alcohol (PVA) film.

In step S203, dyeing processing is performed on the polarizing layer basement membrane by using a first solution of a first ion polarized to light.

The polarizing layer basement membrane is placed into an ion solution polarized to light, and an ion polarized to light is absorbed on the polarizing layer basement membrane, to dye the polarizing layer basement membrane. The step S103 makes, by means of stretching, the first ion form an ion or a molecular long chain having directionality and being capable of absorbing light based on its own direction.

In an embodiment, the ion that is polarized to light and that is contained in the solution used for the dyeing processing is of a single type. The solution can be an iodide ion solution (I2/KI water solution). The polarizing layer basement membrane is placed into the iodide ion solution, iodide ions diffuse and are absorbed on the polarizing layer basement membrane to form a complex, and then the stretching of step S103 makes the iodide ions absorbed on the PVA have directionality, and form an iodide ion long chain. In alternative embodiments, the solution can further be a bromide ion solution, or the like.

In an embodiment, the solution used in the dyeing processing is a mixed solution containing at least two types of ions polarized to light. The mixed solution can be a mixed solution of iodide ions and bromide ions. The polarizing layer basement membrane is placed into the mixed solution of iodide ions and bromide ions, and the iodide ions and the bromide ions diffuse and are absorbed on the polarizing layer basement membrane to form different complexes. The iodide ion and the bromide ion have different polarized directions to light, and therefore, the polarizing layer basement membrane has a multiaxial polarization. In alternative embodiments, the ion that is polarized to light and that is contained in the solution used in the dyeing processing can have different ionic states. For example, the ion in the solution can be $I^{3-}$ ions, or can be $I^{5-}$ ions, or the solution can include both the $I^{3-}$ ions and the $I^{5-}$ ions.

In an embodiment, the dyeing processing process can process different curved areas of the polarizing layer by using different solutions, so that the different curved areas of the polarizing layer have different axial polarizations, thereby further implementing a multiaxial polarization of the polarizing layer. For example, for the polarizing layer shown in FIG. 3, the dyeing processing can be performed on the main visual area 310 by using a solution of a first ion polarized to light, and the dyeing processing can be performed on the auxiliary visual area 321 and the auxiliary visual area 323 by using a solution of a second ion polarized to light. In an embodiment, the dyeing processing is performed on the main visual area 310 by using an iodide ion solution, and the dyeing processing is performed on the auxiliary visual area 321 and the auxiliary visual area 323 by using a bromide ion solution, that is, a chemical element polarized to light in the second ion is an element different from a chemical element polarized to light in the first ion. In an alternative embodiment, the dyeing processing is performed on the main visual area 310 by using an iodide ion solution, and the dyeing processing is performed on the auxiliary visual area 321 and the auxiliary visual area 323 by using a mixed solution of iodide ions and bromide ions. It should be understood that, an actual processing process includes, but is not limited to, the foregoing embodiments.

In another alternative embodiment, different curved areas of the polarizing layer basement membrane can be processed by using a solution having different ionic states of ions polarized to light, so that the different curved areas of the polarizing layer basement membrane have different ionic states, thereby the polarizing layer basement membrane has a multiaxial polarized state. For example, the dyeing processing is performed on the main visual area 310 of the polarizing layer basement membrane by using an ion $I^{3-}$ solution, and the dyeing processing is performed on the auxiliary visual area 321 and the auxiliary visual area 323 of the polarizing layer by using an $I^{5-}$ ion solution, so that the main visual area 310 of the polarizing layer basement membrane has a polarizing alignment axis direction different from that of the auxiliary visual area 321 and the auxiliary visual area 323, that is, a chemical element polarized to light in the second ion is an element same as a chemical element polarized to light in the first ion, but with a different ionic state. In still another alternative embodiment, the dyeing processing can be performed on the main visual area 310 of the polarizing layer basement membrane by using an $I^{3-}$ ion solution, and the dyeing processing may be performed on the auxiliary visual area 321 and the auxiliary visual area 323 by using a mixed solution in which $I^{3-}$ ions and $I^{5-}$ ions coexist.

In an embodiment, in step S103, stretching of different stretching forces or stretching of different directions is performed on different curved areas of the polarizing layer, so that ions polarized to light in corresponding areas have different directionality, that is, so that different areas of the polarizing layer have different polarizing alignment axis directions. In this embodiment, the ion polarized to light is an iodide ion. The iodide ion is absorbed on the polarizing layer and forms an iodide ion long chain after being stretched. Performing stretching of different directions on the polarizing layer or performing stretching of different forces on the polarizing layer makes different iodide ion long chains be formed on the polarizing layer, so that the polarizing layer has different polarizing alignment axis directions. In alternative embodiment, stretching processing can also be performed on different curved areas by using different stretching forces and stretching directions.

An adhesive force of the adhesive layer is reduced due to bending and stretching of the curved area of the display panel, and a reliability problem can be easily caused after a long-time use. In an embodiment, after step S103, the following steps are further included.

The polarizing layer and the adhesive layer are fixed together, and a material of the adhesive layer includes a heat-sensitive substance whose viscosity is increased after being heated.

The polarizing plate is adhered on the curved display panel through the adhesive layer, and then the adhesive layer is heated. The heat-sensitive substance restores to room temperature after being heated, and the viscosity also does not decrease to that before the heating, so that the viscosity of a heated portion of the adhesive layer can be increased, and the adhesive layer has a desirable adhesive force, thereby improving reliability of portions of the curved display panel.

In an embodiment, heating the adhesive layer refers to heating a portion (curved area) having a relatively large curvature on the adhesive layer. A curvature threshold can be set during actual manufacture, and a portion with a curvature greater than the curvature threshold is heated.

Figure 4:
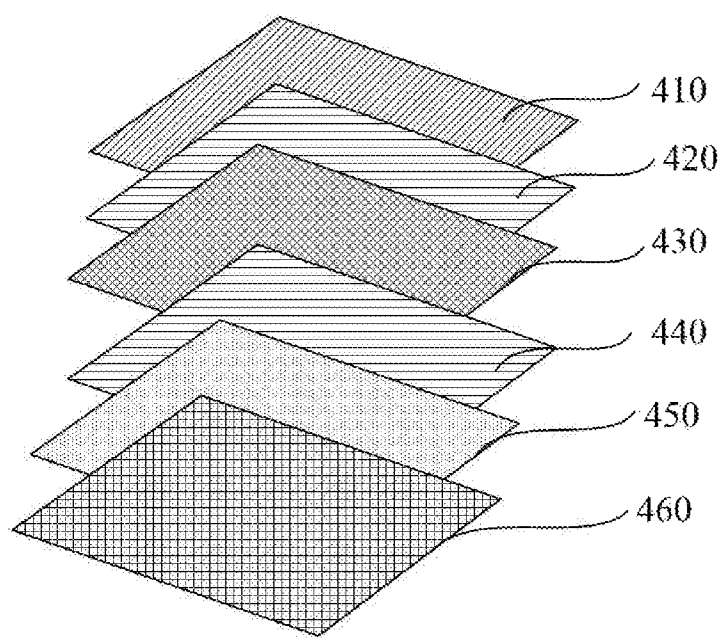
FIG. 4 is a schematic diagram of a polarizing plate in accordance with an embodiment.

The present disclosure further provides a polarizing plate. As shown in FIG. 4, the polarizing plate includes a protective layer 410, a protective layer 420, a polarizing layer 430, a protective layer 440, an adhesive layer 450, and a separation layer 460. The protective layer 410 is a surface protective layer of the polarizing plate, and is used to protect the polarizing layer 430. The protective layer 410 can be polyethylene terephthalate (PET) plastic. The protective layer 420 and the protective layer 440 are separately located on two sides of the polarizing layer 430, and can increase supportive protection for the polarizing layer 430, thereby further increasing mechanical performance of the polarizing plate. The protective layer 420 and the protective layer 440 not only can protect a polarizing layer basement membrane of the polarizing layer 430, but also can prevent retraction of the polarizing layer basement membrane of the polarizing layer 430. In an embodiment, the protective layer 420 and the protective layer 440 can be triacetate cellulose (TAC). As a polarizing matrix of the polarizing plate, the polarizing layer 430 filters light penetrating the polarizing plate. The polarizing layer 430 is a polarizing layer whose different areas have different polarizing alignment axis directions, and the polarizing layer 430 is manufactured by using the manufacture method of a polarizing plate in any one of the foregoing embodiments. The polarizing layer 430 can be poly vinyl alcohol (PVA). The adhesive layer 450 is used to adhere the polarizing plate to the curved display panel. When the polarizing plate is adhered to the curved display panel, the adhesive layer 450 of the polarizing plate is absorbed and adhered to glass of the curved display panel. Generally, the adhesive layer 450 can be a pressure sensitive adhesive (PSV) layer. A main component of a PSA is a polypropylene adhesive, which has relatively small scalability.

In an embodiment, a heat-sensitive substance is added to the PSA. After the polarizing plate is adhered to the curved display panel, a curved position of the curved display panel is heated. Because of the heat-sensitive substance on the adhesive layer 450 of the heated portion, the viscosity of the heated portion is increased, so that the curved portion of the curved display panel has a desirable adhesive force. That is, reliability of portions of the curved display panel is improved. The separation layer 460 is used to protect the adhesive layer 450. The separation layer 460 can be polyethylene terephthalate (PET) plastic.

In the embodiment shown in FIG. 3, an angle formed at a joint of a light-out surface of the main visual area 310 and a light-out surface of the auxiliary visual area 321 is greater than 90 degrees and less than 180 degrees, and an angle formed at a joint of the light-out surface of the main visual area 310 and a light-out surface of the auxiliary visual area 323 is greater than 90 degrees and less than 180 degrees.

The present disclosure further provides a curved display panel. The curved display panel includes a first polarizing plate, a color filter substrate, a liquid crystal layer, a thin-film transistor array substrate, a second polarizing plate, and a backlight module. The first polarizing plate, the color filter substrate, the thin-film transistor array substrate, the second polarizing plate, and the backlight module are overlapped and combined as an integration. The liquid crystal layer is disposed between the color filter substrate and the thin-film transistor array substrate. The backlight module is used to provide a light source for an integration formed by the first polarizing plate, the color filter substrate, the liquid crystal layer, the thin-film transistor array substrate, and the second polarizing plate. The first polarizing plate and the second polarizing plate are both the polarizing plate of any one of the foregoing embodiments, that is, the first polarizing plate and the second polarizing plate are manufactured by using the manufacture method of a polarizing plate of any one of the foregoing embodiments. The curved display panel includes a main visual area and at least one auxiliary visual area, the auxiliary visual area of the curved display panel is connected to at least one side of the main visual area of the curved display panel, a curvature of the auxiliary visual area of the curved display panel is greater than a curvature of the main visual area of the curved display panel, and an angle formed at a joint of a light-out surface of the main visual area of the curved display panel and a light-out surface of the auxiliary visual area of the curved display panel is greater than 90 degrees and less than 180 degrees.

In this embodiment, the curved display panel can be an LCD curved display panel, an OLED curved display panel, a QLED curved display panel, or other curved display panels. This embodiment does not particularly limit the specific type of the curved display panel.

It should be noted that, a display device is, for example, a Liquid Crystal Display (LCD) display device, an Organic Light-Emitting Diode (OLED) display device, a Quantum Dot Light Emitting Diodes (QLED) display device, a curved display device, or other display devices.

Various technical features in the foregoing embodiments can be combined randomly. For ease of description, possible combinations of various technical features in the foregoing embodiments are not all described. However, the combinations of the technical features should be considered as falling within the scope recorded in this specification as long as they have no collision with each other.

The foregoing embodiments only describe several implementations of this application, which are described specifically and in detail, however, it should not be construed as a limitation to the patent scope of the present disclosure. It should be noted that, a person of ordinary skill in the art can make various changes and improvements without departing from the ideas of this application, which shall all fall within the protection scope of this application. Therefore, the protection scope of the patent of this application shall be subject to the appended claims.

What is claimed is:

1. A manufacture method of a polarizing plate, comprising:
   providing a polarizing layer, wherein the polarizing layer comprises multiple curved areas having different curvatures, and a curvature of each curved area is greater than or equal to 2000 R; and
   performing stretching processing on at least some of the curved areas, to adjust a polarizing alignment axis direction of a stretched curved area and a corresponding viewing angle, wherein the stretching processing makes an included angle of the polarizing alignment axis range from 0 to 180 degrees relative to that before the stretching;
   wherein the step of providing the polarizing layer comprises:
      obtaining a polarizing layer basement membrane; and
      performing dyeing processing on the polarizing layer basement membrane by using a first solution of a first ion polarized to light, wherein
      the step of performing the stretching processing on some of the curved areas is making, by means of stretching, the first ion form an ion or a molecular long chain having directionality and being capable of absorbing light based on its own direction.

2. The method according to claim 1, wherein the step of performing stretching processing on at least some of the curved areas comprises:
   applying different stretching forces to different curved areas to obtain different polarizing alignment axis directions.

3. The method according to claim 1, wherein the step of performing stretching processing on at least some of the curved areas comprises:
   applying different stretching angles to different curved areas to obtain different polarizing alignment axis directions.

4. The method according to claim 1, wherein the step of performing stretching processing on at least some of the curved areas comprises:
   applying different stretching forces and angles to different curved areas to obtain different polarizing alignment axis directions.

5. The method according to claim 1, wherein the step of performing the dyeing processing on the polarizing layer basement membrane by using the first solution of the first ion polarized to light comprises:
   placing the polarizing layer basement membrane into an ion solution polarized to light, wherein an ion polarized to light is absorbed on the polarizing layer basement membrane, to dye the polarizing layer basement membrane.

6. The method according to claim 5, wherein the ion is an iodide ion or a bromide ion; and the solution is an iodide ion solution or a bromide ion solution.

7. The method according to claim 5, wherein the ion is an iodide ion and a bromide ion; and the solution is a mixed solution of iodide ions and bromide ions.

8. The method according to claim 1, wherein the step of performing the dyeing processing on the polarizing layer basement membrane by using the first solution of the first ion polarized to light comprises:
   performing dyeing processing on polarizing layer basement membranes of some of the curved areas by using the first solution; and
   performing dyeing processing on polarizing layer basement membranes of some of the curved areas by using a second solution, so that the curved areas on which the dyeing processing is performed by using different solutions have different light absorbing directions; and the second solution comprises a second ion polarized to light.

9. The method according to claim 8, wherein a chemical element polarized to light in the second ion is an element different from a chemical element polarized to light in the first ion.

10. The method according to claim 8, wherein a chemical element polarized to light in the second ion is an element same as a chemical element polarized to light in the first ion, but with a different ionic state.

11. The method according to claim 1, wherein after the step of performing stretching processing on at least some of the curved areas, the method further comprises:
    providing an adhesive layer;
    fixing the polarizing layer and the adhesive layer together, wherein a material of the adhesive layer comprises a heat-sensitive substance whose viscosity is increased after being heated; and
    adhering the polarizing plate on the curved display panel through the adhesive layer, and then performing heating processing on the adhesive layer.

12. The method according to claim 11, wherein the step of performing the heating processing on the adhesive layer comprises:
    setting a curvature threshold of the adhesive layer; and
    heating an area that is in the adhesive layer and has a curvature greater than the curvature threshold.

13. A polarizing plate, comprising:
    a polarizing layer, comprising a main visual area and at least one auxiliary visual area, wherein the auxiliary visual area is connected to at least one side of the main visual area, a curvature of the auxiliary visual area is not equal to a curvature of the main visual area, the curvatures of the auxiliary visual area and the main visual area are both greater than or equal to 2000 R, the auxiliary visual area has a polarizing alignment axis direction different from that of the main visual area, to adjust a viewing angle of the auxiliary visual area, and an included angle between a polarizing alignment axis of the auxiliary visual area and a polarizing alignment axis of the main visual area ranges from 0 to 180 degrees; wherein the polarizing layer is obtained by performing dyeing processing on a polarizing layer basement membrane by using a first solution of a first ion polarized to light; wherein the first ion is made, by means of stretching, form an ion or a molecular long chain having directionality and being capable of absorbing light based on its own direction, to adjust a polarizing alignment axis direction of a stretched curved area and a corresponding viewing angle;

a protective layer, disposed on at least one side of the polarizing layer, and configured to separate the polarizing layer from an external environment; and an adhesive layer, disposed on one side of the protective layer relative to the polarizing layer, and configured to adhere the polarizing plate on a curved display panel.

14. The polarizing plate according to claim 13, wherein the curvature of the auxiliary visual area is greater than the curvature of the main visual area, and an angle formed at a joint of a light-out surface of the main visual area and a light-out surface of the auxiliary visual area is greater than 90 degrees and less than 180 degrees.

15. The polarizing plate according to claim 14, wherein a material of the adhesive layer comprises a heat-sensitive substance whose viscosity is increased after being heated.

16. A curved display panel, comprising:

a first polarizing plate; and a second polarizing plate, wherein the first polarizing plate and the second polarizing plate are the polarizing plate according to claim 14, wherein the curved display panel comprises a main visual area and at least one auxiliary visual area, an auxiliary visual area of the curved display panel is connected to at least one side of the main visual area of the curved display panel, a curvature of the auxiliary visual area of the curved display panel is greater than a curvature of the main visual area of the curved display panel, and an angle formed at a joint of a light-out surface of the main visual area of the curved display panel and a light-out surface of the auxiliary visual area of the curved display panel is greater than 90 degrees and less than 180 degrees.

* * * * *